United States Patent [19]

Richter et al.

[11] Patent Number: 5,598,553

[45] Date of Patent: *Jan. 28, 1997

[54] PROGRAM WATCHPOINT CHECKING USING PAGING WITH SUB-PAGE VALIDITY

[75] Inventors: David E. Richter, San Jose; Earl T. Cohen, Fremont; James S. Blomgren, San Jose, all of Calif.

[73] Assignee: Exponential Technology, Inc., San Jose, Calif.

[ * ] Notice: The term of this patent shall not extend beyond the expiration date of Pat. No. 5,440,710.

[21] Appl. No.: 444,813

[22] Filed: May 18, 1995

Related U.S. Application Data

[63] Continuation of Ser. No. 207,857, Mar. 8, 1994, Pat. No. 5,440,710.

[51] Int. Cl.$^6$ ............................................. G06F 9/455
[52] U.S. Cl. ............................................. 395/500; 395/419
[58] Field of Search ........................ 395/183.1, 183.14, 395/413, 415, 416, 418, 419, 500

[56] References Cited

U.S. PATENT DOCUMENTS 4,675,646  1/1987  Lauer ................................. 340/146.2
5,239,642  8/1993  Guitierrez et al. ...................... 395/425
5,249,278  9/1993  Krauskopf .............................. 395/400
5,371,894  12/1994  DiBrino ................................. 395/800

Primary Examiner—William M. Treat
Attorney, Agent, or Firm—Stuart T. Auvinen

[57] ABSTRACT

Segmentation is added to a reduced instruction set computer (RISC) processor which supports paging. The arithmetic-logic-unit (ALU) is extended to allow for a 3-port addition so that the segment base can be added when the virtual address is being generated. Segment bounds checking is achieved by extending the paging system to allow for valid regions that are less than the full page size. Sub-page validity can mimic segmentation because a segment can be broken up into a number of full pages and one or more partially-valid pages at the segment boundaries. A page that is not wholly valid has an "event" on the page, and a memory reference to this page will either cause a software routine to be invoked to check the segment bound, or an extension to the TLB, called a sub-page validity buffer, is used to check if the reference was to a valid portion of the page. Events may also be defined for program watchpoints and defective memory locations. Segment bounds thus do not have to be compared for each access, and the bounds do not even have to be stored on the CPU die.

25 Claims, 8 Drawing Sheets

Fig. 5: Prior Art

PROGRAM WATCHPOINT CHECKING USING PAGING WITH SUB-PAGE VALIDITY

RELATED APPLICATION

This application is a continuation of Ser. No. 08/207,857 filed Mar. 8, 1994, now U.S. Pat. No. 5,440,710.

BACKGROUND OF THE INVENTION—FIELD OF THE INVENTION

This invention relates to digital computer systems, and more particularly to memory management using segmentation and paging.

BACKGROUND OF THE INVENTION—DESCRIPTION OF THE RELATED ART

Computers have been designed to allow several different users to share the same central processing unit, or CPU. These multi-user, multi-tasking systems provide protection between users through memory management techniques such as segmentation and paging. These techniques divide memory up into variable-sized segments and fixed-sized pages. One user is prevented from harming data stored in another user's segments or pages because the CPU checks that memory references are to a segment or page belonging to that user. Some segments or pages may be shared among several users, or several users may have "read access" but may not alter or "write" data in a shared segment or page.

Some computer architectures, such as for RISC or reduced instruction set computers, employ paging without segmentation, since paging can be simple to implement. However CISC (complex instruction set computer) architectures such as the x86 architecture, at present embodied in CPU's such as the 386 and 486 manufactured by Intel Corporation of Santa Clara, Calif., and others, employs both segmentation and paging.

In a paging system, a page table provides the mapping or translation between a program or virtual address generated by the user's program, and a physical address of a location in memory. Physical memory is divided into many pages, with each page being the same size, typically 4096 or 4 K bytes. Each page begins and ends on a "page boundary", which is always a multiple of the page size, 4 K bytes. FIG. 1 shows that a virtual address 50 is composed of two parts: the lower 12 bits form the address within a page, or page offset 52, while the upper address bits determine which page is accessed in this embodiment. The upper bits of the virtual address are the virtual page number 54, and these upper bits are translated and replaced with a physical page number 56. A page table in main memory, or a cache of the page table, called a translation-lookaside buffer or TLB 62, is used to translate the virtual page number 54 to the physical page number 56. The physical address 60 is thus composed of the translated page number 56 and the untranslated offset 58.

Page tables and TLB's are well-known and are discussed more fully with respect to the x86 architecture in U.S. Pat. No. 4,972,338, issued in 1990 to Crawford and assigned to Intel Corporation of Santa Clara, Calif. A TLB is a small cache of the most recently used translations in the page tables. Inasmuch as the page tables are usually stored in main memory, accessing the page table for each memory reference adds significant overhead to each reference and slow the system down. Since each page table translation or entry covers 4K memory bytes, relatively few page table entries need to be cached by the TLB for a high hit rate and improved performance.

SEGMENTATION SIMILAR TO PAGING

Segmentation provides a mechanism to identify a range of addresses that are valid for access. Any memory accesses outside of the segment, defined by the base and the limit, will cause a segment fault, which will interrupt the user program and return control to a supervisory program such as an operating system. Likewise paging is a mechanism to validate memory accesses, but paging defines a valid block of memory that is always a multiple of the fixed page size, typically 4K bytes, and that begins and ends on an address that is a multiple of 4K bytes. Addresses failing outside any pages cached in the TLB will cause a translator, implemented either in hardware or software, to load a translation entry for the new page into the TLB. If the new page is beyond the user's allocated memory, then a page fault similar to the segment out-of-bounds fault can be signalled by the translator.

Both segmentation and paging can be used for memory protection and management. Both perform a similar function in re-locating or mapping the user's memory references, and both can include accessibility attributes such as read-only, execute-only, dirty, and referenced. However, because segments may begin and end at any arbitrary address, not just at page boundaries, a separate segmentation unit is normally required. Having two additional 32-bit adders for the base addition and the limit check is expensive and adds complexity. Typically an extra processor clock cycle is needed for the segmentation unit. Since RISC systems are designed to be simple and fast, segmentation is often avoided by RISC CPU designers, or a simplified segmentation scheme is used.

Because of the similarity in functions provided by the two memory management techniques, and the desire to emulate CISC architectures such as the x86 architecture, on a RISC CPU, what is desired is to emulate x86 segmentation on a RISC CPU that supports paging.

SUMMARY OF THE INVENTION

Segmentation from a CISC architecture is emulated with the paging system of a RISC CPU. The paging system of the RISC CPU has a sub-page validity buffer for assisting with emulation of segment bounds checking. The sub-page validity buffer indicates which portion of a page is valid. The sub-page validity buffer is for checking validity of a virtual address which comprises a virtual page number and a page offset. The sub-page validity buffer comprises a plurality of buffer entries, each of the plurality of buffer entries comprises a virtual page number field for comparing with the virtual page number and a sub-page validity field for indicating a valid subset of page offsets.

A first compare means receives the virtual page number of the virtual address, and compares the virtual page number field of the plurality of buffer entries with the virtual page number of the virtual address. The first compare means indicates a selected buffer entry in the plurality of buffer entries if one of the virtual page number fields in the plurality of buffer entries matches with the virtual page number of the virtual address. The selected buffer entry has a matching virtual page number field and a selected sub-page validity field.

A second compare means receives the selected sub-page validity field from the selected buffer entry and compares the page offset to the valid subset of page offsets. The second compare means indicates that the page offset is invalid if the page offset is not within the valid subset of page offsets. Validity of the page offset is checked for pages having only a subset of page offsets valid. This allows for emulation of segment bounds checking, watchpoint detection, and disabling of faulty memory blocks by specifying only a subset of the page offsets as valid.

In another aspect of the invention, the sub-page validity field is stored within the TLB itself, rather than in a separate sub-page validity buffer. Further aspects of the invention include a TLB that is not loaded with a partially-valid page, but that uses a software handler routine to perform segment bounds checking for partially-valid pages.

DETAILED DESCRIPTION

This improvement relates to emulation of segment bounds checking using an existing paging system. While the detailed description describes the invention in the context of CISC (complex instruction set computer) segmentation being emulated on a RISC (reduced instruction set computer) central processing unit (CPU), it is contemplated that the invention will apply to other architectures besides RISC and CISC without departing from the spirit of the invention.

Figure 2:
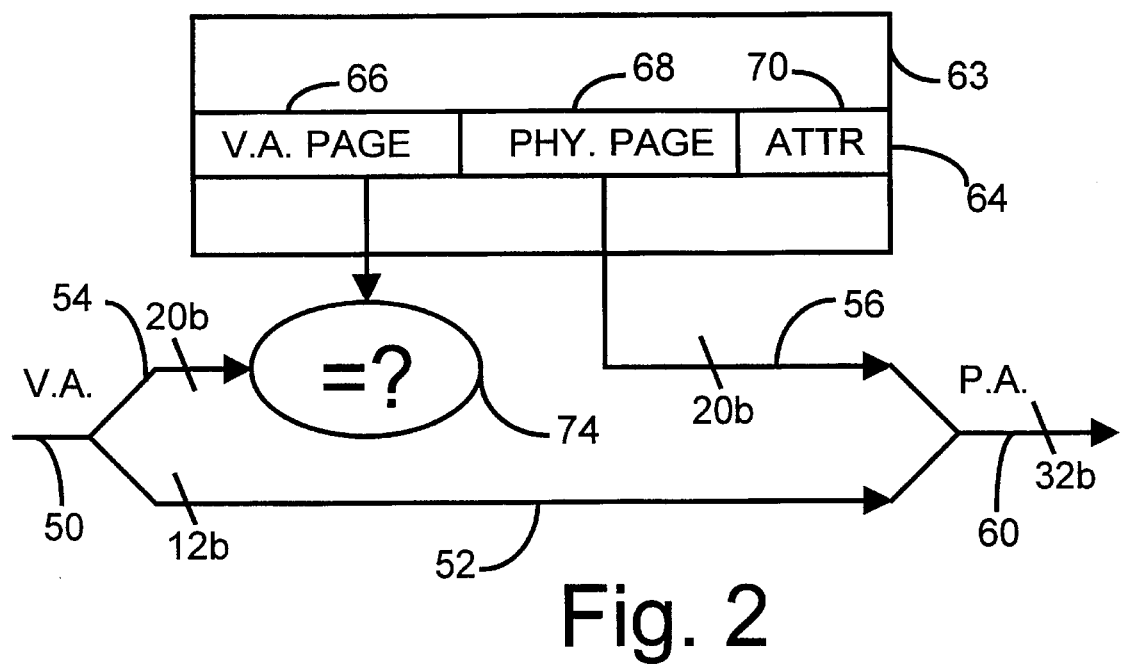
FIG. 2 is a translation-lookaside buffer.

FIG. 2 is a diagram of a typical translation-lookaside buffer or TLB. A table of entries 63 is stored in a RAM array. One entry 64 is shown having a virtual page number field 66, a physical page number field 68, and attributes field 70. A 32-bit virtual address 50 is inputted from the address generation logic, and is broken into a lower 12-bit offset part 52, which is not translated, and an upper 20-bit virtual page number 54. If the TLB is fully associative, then the virtual page number 66 for each entry in the TLB will be compared by comparator 74 to the input virtual page number 54 to determine if any addresses match. A set-associative TLB will use part of the input virtual address as an index to select a subset of the entries, and this subset of entries will be compared to the input virtual page number 54 for a match. If a match or hit occurs, then the 20-bit physical page number 68 will be read out of the matching TLB entry and concatenated with the offset 52 to form the full 32-bit physical address 60.

Attributes stored in the TLB can include protection bits which can make a page readonly, executable, or writable for a particular user, and can also include reference bits which indicate if the data on the page has been modified and will need to be written back to a master storage area such as a disk drive. When a page is referenced, the CPU or operating system can check or modify these bits and take appropriate action. A "page fault" is signaled if an unallowed access (write to a read-only page, etc.) is attempted, or if a miss occurs (the translation is not present in the TLB). The page fault will usually cause the user's program to suspend while a supervisory program, such as an operating system, loads, corrects or modifies the TLB or page tables before returning control to the user program.

The TLB may be filled and controlled by hardware on the CPU, such as a translator, or the TLB may be refilled by a software program such as an operating system. When a page fault occurs, the hardware or software will re-load or modify the TLB and return control to the program at the instruction that caused the page fault, which should not page-fault a second time for the same reason. Thus the page fault handler should be invisible to the user's program.

Figure 3:
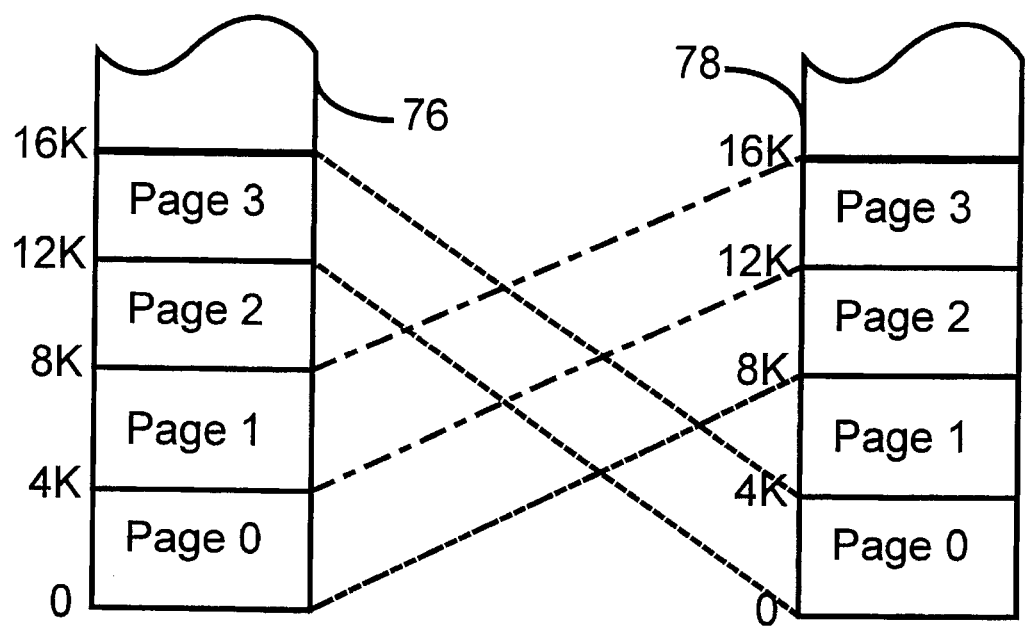
FIG. 3 is a conceptual diagram of paging.

FIG. 3 shows that a virtual memory space 76 may be re-mapped to a physical memory space 78 by paging. Pages may be re-ordered and re-located by the paging mechanism. For example, virtual page number 0 is mapped to physical page number 2, while virtual page 3 is mapped to physical page 0. Thus paging can re-locate pages to anywhere in the physical memory, but it can only re-locate blocks that are one or more pages in size, and the blocks must end and begin on 4K-byte page boundaries.

Figure 4:
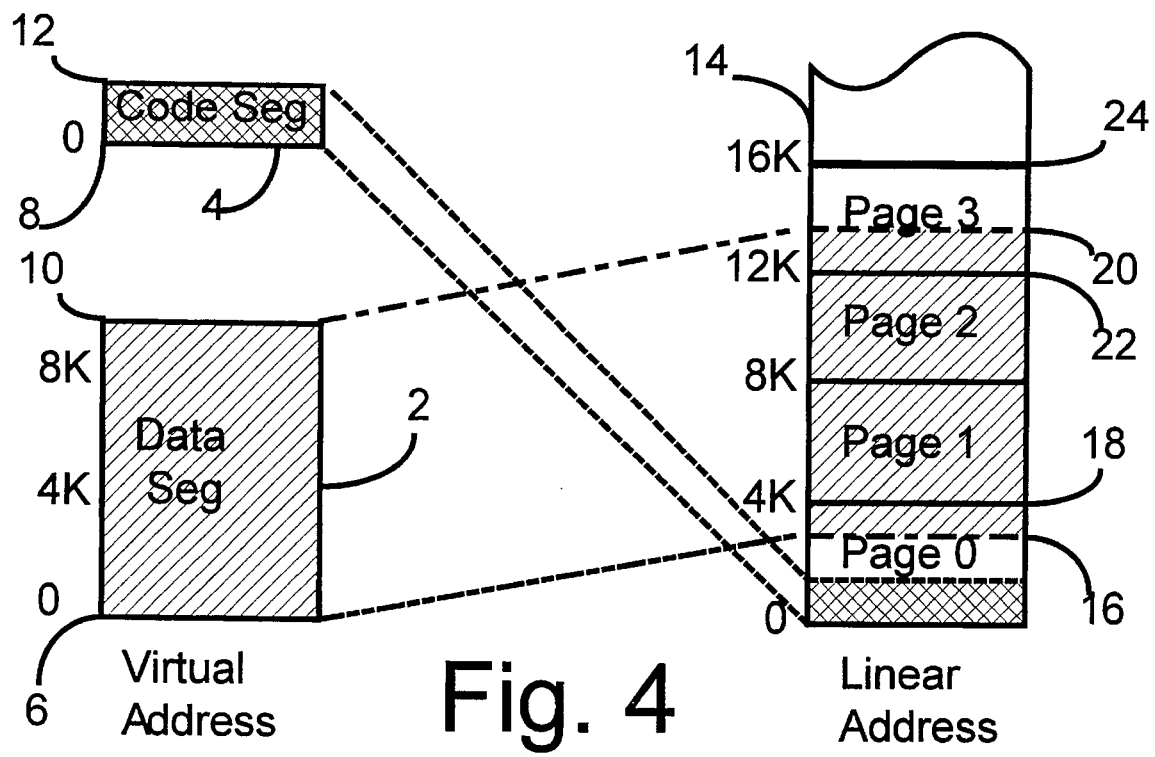
FIG. 4 is a conceptual diagram of segmentation.

Segmentation can be combined with paging. Segmentation performs a first translation, translating a virtual address to a linear address. Then the linear address is inputted to the paging unit in lieu of the virtual address, and is then translated to a physical address. Thus the virtual memory space 76 of FIG. 3 is replaced with a linear memory space when segmentation first translates the virtual addresses to linear addresses. FIG. 4 is a diagram showing a small portion of a linear memory space 14 accessed by a CPU. The memory space 14 is split up by paging into pages of 4096 bytes each (4 Kbytes). These pages may next be reordered by the paging unit as was shown in FIG. 3. A user program may have access to one or more pages or segments, while another user may have access to other pages and segments.

Data segment 2 is accessed by user A with program or virtual addresses. These virtual addresses start at address 0 bytes, reference numeral 6, and go up to the segment limit 10, which is 9000 bytes in this example. Any user memory reference to data segment 2 with an address less than 0 would cause a memory reference error or exception for being below the lower bound. Likewise, any memory references to data segment 2 with an address greater than 9000 bytes would cause a memory error for being above the upper limit or bound. Code segment 4 is another segment accessed by user A, and has a start address 8 at 0 bytes and an upper bound 12 at 500 bytes. The program will indicate which segment to access either implicitly or indirectly by referencing a certain register or using a certain type of instruction, or directly by specifying the segment to use in the instruction. The virtual address alone does not completely specify the memory location, since the same virtual address may exist in several different segments.

Segments 2 and 4 are mapped into the linear memory space 14 by a segmentation unit on the CPU. Segment 2 has a base address 16 of 4000 bytes, which is 96 bytes below the beginning 18 of page 1 at 4096 bytes (4 Kbytes). Since segment 2 is 9000 bytes long, the upper bound 20 is BASE+LIMIT, or 4000+(9000−1)=12,999 bytes. Address 12,999 is the last valid address of the data segment 2. Page 3 starts at address 22, which is 12 Kbytes, or 12,288 bytes, and ends at address 24, which is 16 Kbytes, or 16,384 bytes. Thus segment 2 begins within page 0 and ends in the middle of page 3. As shown, segment 4 fits entirely within page 0, being only 500 bytes long and not crossing a page boundary.

Figure 5:
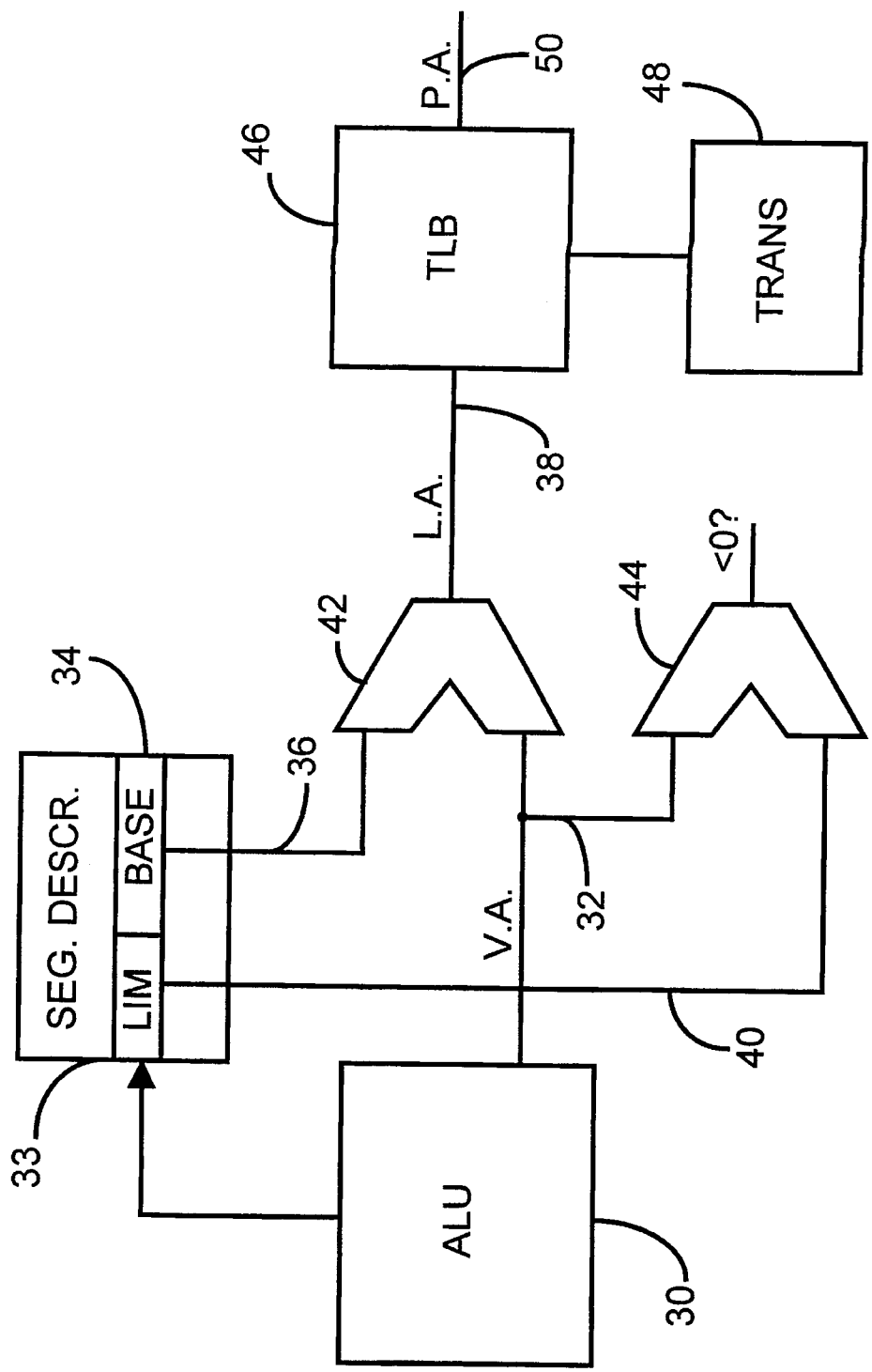
FIG. 5 is a block diagram of a prior-art CPU with segmentation and paging.

FIG. 5 is a block diagram of address generation in a typical x86 processor, which includes both segmentation and paging. ALU 30 calculates a virtual address 32 from address components indicated by an instruction being processed. ALU 30 or other decode logic (not shown) indicates which segment is being referenced by the instruction and selects one segment descriptor 34 in a segment descriptor register array 33. The selected segment descriptor 34 includes a base address field which outputs the base or starting address of the selected segment on line 36, and a limit or upper bound which is outputted on line 40. Virtual address 32 is added to the base address 36 in segment adder 42, to produce a linear address 38. The segment adder 42 must be a full 32-bit adder in the x86 architecture because segments can begin and end on any boundary, down to single-byte granularity. Other architectures that restrict the segment to begin and end on page boundaries need not add the lower 12 bits, and thus can use a smaller adder.

Subtractor 44 subtracts the virtual address 32 from the limit 40. If a negative value results, then the virtual address exceeds the limit and a segment overrun error is signaled. A second adder/subtractor could be used to check the lower bound of the segment; however if the lower bound is always virtual address 0, then the segment adder 42 can be used for the lower bound check. If the result is a negative number then the lower bound has been violated. Thus the negative flag or the sign bit may be used for lower bound checking. Comparators may also be employed for bounds checking.

Figure 1:
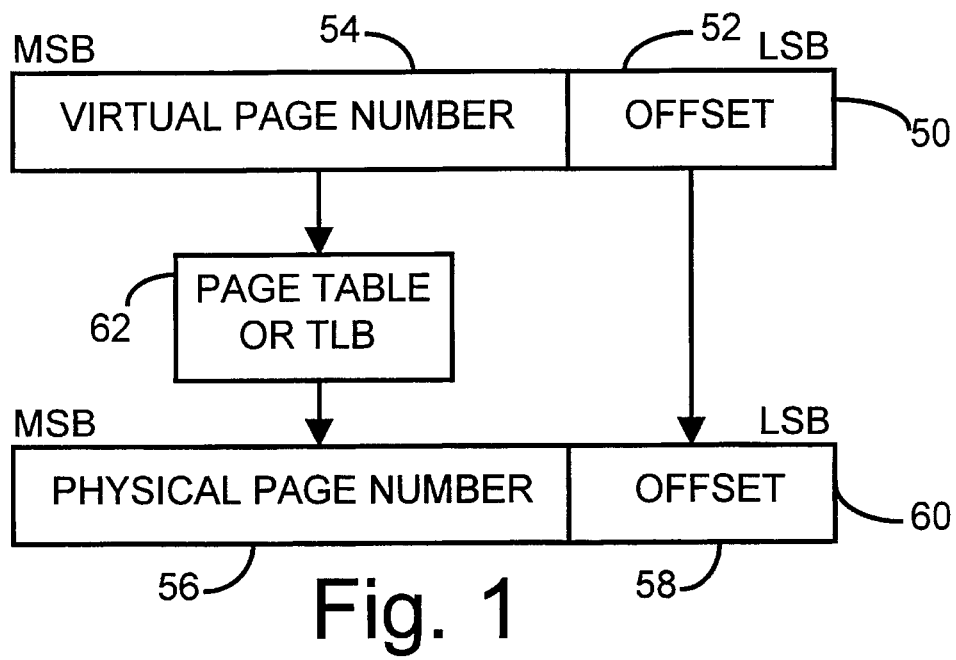
FIG. 1 shows how a virtual address is translated to physical address components.

Linear address 38 is translated to a physical address by translation-lookaside buffer or TLB 46, which is a small cache of the page translation tables stored in main memory. As previously described in reference to FIGS. 1 and 2, the TLB 46 translates the upper 20 bits of the linear address by searching the associative TLB cache for a match, and if one is found, then replacing these upper 20 bits with another 20 bits stored in the TLB 46.

If the linear address is not found in the TLB, then a miss is signaled to the translator 48, which accesses the page tables in main memory and loads into the TLB the page table entry that corresponds to the linear address. Future references to the same page will "hit" in the TLB, which will provide the translation. Translator 48 may be implemented entirely in hardware, entirely in software, or in a combination of hardware and software.

EMULATION OF SEGMENTATION WITH A PAGING-ONLY CPU

The invention emulates segmentation with a RISC CPU that typically only supports paging. The segmentation hardware of prior-art CPU's does not need to be added to the RISC CPU when this invention is used. Reducing the amount of hardware on a CPU is greatly desired because the cost and complexity of the CPU is reduced. However, segmentation must be supported in some cases for software compatibility. These and other advantages of the invention will become apparent upon examination of the detailed description of some of the embodiments of the invention.

Two functions must be performed in order to emulate segmentation: the segment base must be added to the virtual address, and the resulting linear address must be checked for validity. The base addition can be performed in the central processing unit's (CPU's) arithmetic-logic-unit (ALU). The 2-port ALU normally required to generate the virtual address from address components may be extended to a 3-port ALU, which allows the segment base to be added to the components of the virtual address at the same time that the virtual address is being generated. Thus the ALU calculates the linear address directly, rather than just the virtual address. Using a 3-port ALU eliminates the extra pipestage and processor clock cycle required if a separate addition step for the segment base is employed. Thus the ALU will output the linear address, but without checking the address for validity.

The second function, the validity checks, includes the base and bounds check, and attributes checking. Segment attributes such as read-only and dirty are almost identical to the attributes needed for paging. Thus paging can perform all the attribute checking for both segmentation and paging. The operating system or emulation software merely has to ensure that the paging attributes are set to reflect the most restrictive combination of the paging and the segment attributes. For example, if the page is read-write, but the segment is read-only, then the entry in the TLB for this region is set to read-only, the more restrictive.

Base and bounds checking would be simple if segments always began and ended on page boundaries, because the un-augmented paging hardware could be used. When segments begin and end at arbitrary boundaries, only a part of a page may be valid. For example, in FIG. 4 data segment 2 is mapped by segmentation to all of pages 1 and 2, and to the upper portion of page 0, and to the lower portion of page 3. Only the part of page 0 between the base 16 and the page boundary 18 is valid for segment 2. Likewise, only the lower portion of page 3, from page boundary 22 to segment bound 20, is valid.

EVENTS ON PAGES

The invention can be more readily understood by introducing the concept of an event. An event is a location in memory that requires special processing not supported by a typical prior-art paging system. The paging system of the present invention performs special operations for pages having an event located within the page. These special operations allow for emulating segment bounds checking or other CISC memory features. However, the prior-art segmentation hardware does not need to be added to a CPU using the present invention.

An "event" may be defined for any page that is not wholly valid. In the example of segment 2 of FIG. 4, pages 0 and 3 have events on them, while pages 1 and 2 do not. Events exist at the base and bound of segments, because there only a portion of the page may be valid for the segment. Pages without events are handled by the paging hardware and software without any modification. Thus references within segment 2 that lie on pages 1 or 2 will be translated by the paging system without bounds checking, whereas in the prior art of FIG. 5 bounds checking is performed on all references in a segment. However, pages with events must be handled in a special manner to ensure that only the valid portion of the page is accessed.

Events may also be defined to support other features, such as removing defective memory locations by mapping out these bad locations that commonly occur in large memory arrays such as dynamic RAM. Another use for events is for setting program watchpoints where the program halts execution when a specified address or range of addresses are referenced. In FIG. 4, if DRAM addresses 6000 to 6016 were faulty, page 1 could have an event defined for it to disable references to these faulty address locations. Emulation software could re-direct the references away from the faulty memory locations to other unused memory. Thus the entire DRAM bank of chips would not have to be disabled, only those specific faulty locations within the DRAM chips.

Thus events are used to designate some pages as having partial validity, regardless of the reason for the event. Events extend the paging system's validity to finer granularities than an entire page, yet pages without events are processed as they normally would be.

Various embodiments of the invention will now be described. These embodiments use events to designate pages that are partially valid. Emulation of segment bounds checking is thus possible because pages may be only partially valid.

EVENT HANDLING BY SUPERVISORY CODE

The first embodiment of the present invention is simple, requiring that very little or no additional hardware be added to the CPU. The most basic method of handling events is to not load into the TLB any page with a defined event. Thus any reference to pages with events would cause a page fault, which would then cause a supervisory software routine to be processed. This routine can check attributes and perform a bounds check using simple instructions. The routine would load the segment descriptors from memory, or extract the base or bounds value from the descriptor, and compare the bound to the virtual address, possibly with a subtract and a compare/test flags instruction. If the reference is not valid, such as when a segment fault occurs, the code would take the appropriate action. This action may include returning control to the operating system or a supervisory program. A valid reference could be emulated by the supervisory routine, for example by reading or writing memory and loading a CPU register with the data item, before returning control to the user program at the following instruction.

ONE-TIME TLB ENTRY

If the reference is valid, the supervisory program may also use a special one-time TLB entry, rather than emulate the instruction. A permanent TLB entry cannot be loaded because future references to the page might lie outside the valid portion of the page. Only completely valid pages are loaded into the TLB in this embodiment. The page tables are accessed by the supervisory program to translate the linear address to a physical address. The supervisory program loads a one-time TLB entry with the virtual address and the physical address, the correct translation needed by the faulting instruction, and returns control to the user program. The user program repeats the faulting instruction, which does not fault a second time but uses the translation that was just loaded into the one-time TLB entry. If the next instruction also references the same event-containing page, then another page fault is signaled because the one-time TLB entry becomes invalid after being used. The supervisory program will again check the reference for validity, and possibly again load the one-time TLB entry and return to the user program. Thus the supervisory program will check each reference on a page containing an event, but unlike the previous embodiment, the supervisory program is not required to emulate the faulting user instruction.

While this method results in many page faults when pages containing events are being referenced, the performance loss may not be significant for large segments of many pages, because only the partial pages at the beginning and end of the segment cause page faults. Nearly all of the large segment lies in fully valid pages.

The one-time TLB entry may be implemented in several ways. A normal TLB entry may include an extra "one-time-only" bit in the attributes field. This bit would be set, validating the entry when the TLB entry is loaded by the supervisory program. The first memory reference after returning to the user program would clear this bit, which would invalidate the reference for future instructions. Only the next instruction after returning control to the user program could use the TLB entry.

Another implementation is an auxiliary one-time TLB. This TLB could have only a single entry. This has the advantage of not adding complexity to the main TLB. Other implementations might have only a subset of the TLB entries with the one-time attribute bit. Having more than a single one-time TLB entry may be beneficial when an instruction is able to make several memory references, such as for fetching multiple operands or words from code.

VARIABLE-PAGE-SIZE TLB

Another embodiment for sub-page validity checking does not require the intervention of supervisory code for every reference to a page containing an event. Additional bits of information are stored in the TLB to indicate the size of the valid page. Not all entries in the TLB need to have the page size fields, so the additional cost of this embodiment can be reduced by having only a few TLB entries with the additional page size fields. The pages can be full size, 4K bytes, or a fraction of the full page size, but only powers of 2 are used in order to simplify the design. Pages sizes may be 4K, 2K, 1K, 512, 256, 128, 64, 32, 16, 8, 4, 2, or 1 byte.

If a direct-mapped or set-associative TLB were used, then any particular page could only be located in 1 or a few locations in the TLB, up to the degree of set associativity. In this embodiment the TLB is preferably fully associative, so that a single page containing an event may have several entries in the TLB, not just one. The entries will indicate which parts of the page are valid, with each entry being of a different size in most cases. For example, if a segment ends at offset 0xDA5 hex, or 3492 decimal, in a 4K-byte page, the following entries would be loaded in the TLB for that one page:

TABLE 1

Variable Page Size TLB Entries Example

| Entry # | Page Size (bytes) | Page Offset (decimal) | Page offset calculation |
|---|---|---|---|
| 1 | 2K | 0 | 0 |
| 2 | 1K | 2048 | 2K |
| 3 | 256 | 3072 | 2K + 1K |
| 4 | 128 | 3328 | 3K + 256 |
| 5 | 32 | 3456 | 3K + 256 + 128 |
| 6 | 4 | 3488 | 3K + 256 + 128 + 32 |
| 7 | 1 | 3492 | 3K + 256 + 128 + 32 + 4 |

Thus 7 entries would be loaded into the TLB for this single page. Each entry designates a successively smaller portion of the page, down to single-byte granularity. All 7 entries would contain the same virtual page number in the virtual address match field, and all entries would be page hits. The page size field is then used to determine how many additional address bits should be compared. A page size of 2K will indicate that one additional address bit is compared. If 4K is designated by the 13th address bit, A12, then A11, the next least-significant bit (LSB), will also be compared. A page size of 1K will require that 2 additional bits be compared, while a page size of 1 byte will require that all the low-order page offset bits be compared. All specified additional bits must match for the entry to be a complete hit.

Figure 6:
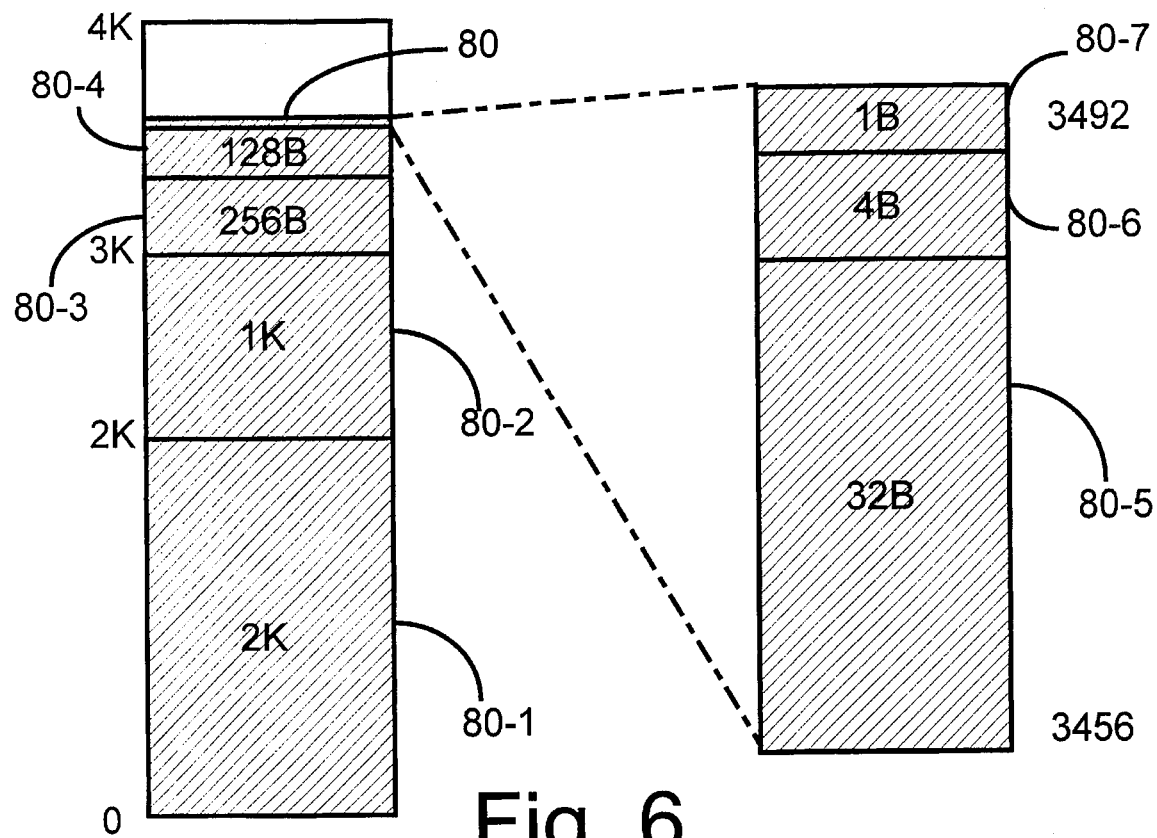
FIG. 6 shows how the TLB entries are combined to define a sub-page block.

In Table 1, each entry has a successively larger page offset as the sub-page size decreases. FIG. 6 shows graphically how the TLB entries of Table 1 are combined to define a memory block 80 that is valid from page offset 0, to offset 0xDA5 hex (3492 decimal). Entry 1 defines a 2 K-byte sub-page 80-1 from address 0 to address 2047. Entry 2 defines a 1 K-byte sub-page 80-2 from address 2048 to address 3071, while entry 3 defines a 256-byte sub-page 80-3 from address 3072 to 3327. Likewise entries 4 to 7 define successively smaller sub-pages 80-4, 80-5, 80-6 until the last (7th) entry defines a 1-byte sub-page 80-7 at address 3492. Thus by combining sub-pages 80-1 through 80-7, a valid block 80 from address offset 0 to 3492 is defined.

Figure 7:
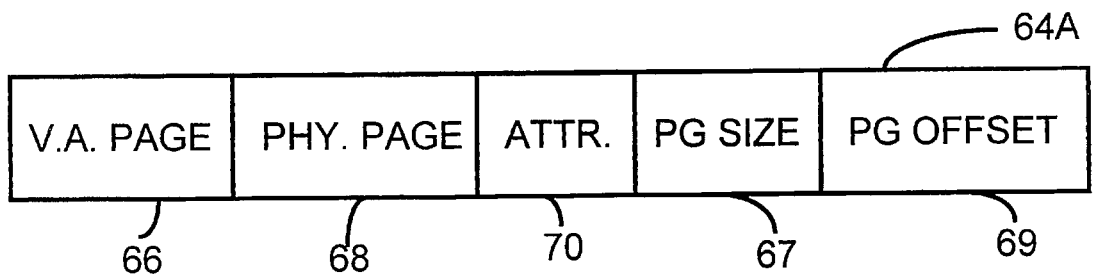
FIG. 7 is a TLB entry having a variable page size.

This embodiment requires that 2 additional fields be stored with the TLB entry. FIG. 7 shows an entry 64A in the TLB for this embodiment. Entry 64A contains a virtual page number field 66, a physical page number field 68, and attributes field 70, as in the prior-art TLB entry 64 of FIG. 2. A page size field 67 indicates the sub-page size, from 4K to 1 byte. As there are 13 possible sizes, 4 binary bits can be used to encode the sub-page size. These 4 bits are decoded, and each decoded bit is used to enable a bit-wise compare of a successively lower-significance address bit. The second additional field is the sub-page offset field 69. This field 69 specifies the starting address of the sub-page within the page. In a full implementation of a 4 K byte page, down to byte granularity, this field 69 is 12-bits wide, the full offset address size.

TLB BIT-MASK FOR BOUND ENCODING

The previous embodiment required several entries in the TLB for a single event-containing page. Events may also be specified using just a single TLB entry. In this embodiment, some TLB entries are extended with additional bits to encode the sub-page validity information. This sub-page validity information will be consulted to determine if a memory reference is a valid hit in the TLB. The TLB will determine if a page hit has occurred by comparing the virtual page number from the ALU to the virtual page number stored in the TLB entries. If a page hit is detected for an entry, then the sub-page validity information will be consulted to determine if the memory reference falls within a valid portion of the page. Thus a subset of all the page offsets may be specified as being valid.

A trivial but expensive embodiment is to store one sub-page valid or mask bit for every byte in the page. Thus 4096 mask bits would be required, one mask bit for every byte within the 4 K-byte page. This bit-mask field will be consulted if the referenced virtual page number matches the virtual page number stored in the TLB. Each byte that is referenced must also have its corresponding valid bit set in the bit-mask field for the reference to be a valid one.

Since there are typically only a limited number of events on any particular page, a full 4 K-byte bit mask is not needed. Less expensive embodiments are thus possible that allow for a limited number of events on a page.

PAGE OFFSET BOUNDS ENCODING

Figure 8:
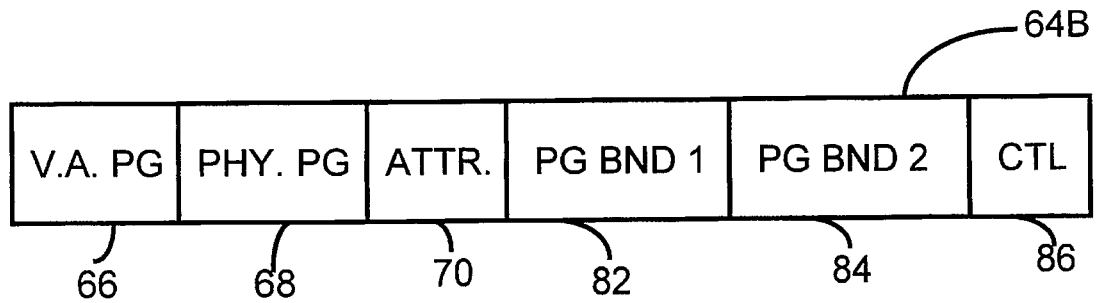
FIG. 8 is a TLB entry containing page offset bounds.

In this embodiment, shown in FIG. 8, the TLB entry 64B has the virtual page number field 66, the physical page number field 68, and attributes 70 of the prior-art TLB. In addition, a first bounds field 82 and a second bounds field 84 are added. Each bounds field encodes a page-offset address of an event. For example, the page-offset bounds could encode the offset address of the base or the upper bound of a segment that lie within a page. Two offset bounds fields are provided in this embodiment for efficient encoding of pages with two events, which occur for small segments that lie entirely within a single page, program watchpoints, and faulty memory locations. These are typically small blocks within a page. Thus by having two offset bounds fields, the starting and ending addresses for the small block may be specified.

The page-offset bounds fields 82, 84 contain enough bits to specify the page offset down to the desired granularity. Thus for a 4 K-byte page, which has 12 bits of address offset, 32-bit aligned word granularity requires that 10 bits be stored in each offset bounds field 82, 84, while full byte-granularity requires that a full 12-bit offset address be stored in each offset bounds field 82, 84.

Control bits 86 specify how the offset bounds 82, 84 are to be interpreted. For a first offset bounds 82 having a value "x" and a second offset bounds 84 having a value of "y", a simple encoding for control bits 86 is shown in Table 2.

TABLE 2

Control Bits Encoding for Page Offset Bounds

| Type | Control Bits | Referenced Page Offset is Valid if: |
| --- | --- | --- |
| Whole Page | 000 | Whole page valid |
| Segment Base | 001 | >x |
| Segment Bound | 010 | <y |
| Within Page | 011 | >x AND <y |
| Two at Ends | 100 | <x OR >y |

Several types of events may be supported with two offset bounds and the encoding of Table 2. With the control bits 86 set to "000", the entire page is valid. An encoding of "001" specifies that all address greater than the first offset bound 82 is valid, as when a segment begins within a page. The "010" encoding may be used for the end of a segment, when the upper bound ends within a page. Thus the second offset bound 84 specifies the upper limit of validity within the page. Encoding "011" specifies validity between the two offset bounds 82, 84, which may be used to specify a segment that lies entirely within a single page. The "100" encoding specifies that the entire page is valid except the region between the two offset bounds 82, 84. This is used for watchpoints and disabling faulty memory locations. Any reference between the two bounds 82, 84 will cause a page fault.

While an embodiment with only two page offset bounds fields 82, 84 has been explained, it would be obvious for one skilled in the art to employ a different number of offset bounds fields or a different number of encoding control bits 86. For example, the encoding may be changed for greater than or equal to a page offset bound value, and still fall within the spirit of the invention.

VALID MASK

Another embodiment of sub-page validity checking on a TLB is to use a valid mask field. There are many embodiments possible, and the one described herein is meant to be illustrative and not to limit the invention to the exact form shown.

A valid mask field 88 is added to the TLB entry 64C, which contains the virtual page number field 66, the physical page number field 68, and attributes 70, as in the prior-art. The valid mask field 88 is split up into 4 sub-fields 90, 91, 92, 93, each of which is a bit mask for a certain granularity of references. Sub-field 90 contains an 8-bit mask, one bit for each of the 8 512-byte sub-blocks in a 4 K-byte page. Sub-field 91 contains an 8-bit mask, one bit for each of the 8 64-byte sub-blocks within one of the 512-byte sub-blocks of the page. Likewise, sub-field 92 contains an 8-bit mask, one bit for each of the 8 8-byte sub-blocks within one of the 64-byte sub-blocks of the page, and sub-field 93 contains an 8-bit mask, one bit for each of the 8 1-byte sub-blocks within one of the 8-byte sub-blocks of the page. Thus 4 8-bit masks in sub-fields 90, 91, 92, 93 are used to specify an event with increasingly finer granularity. Each of sub-fields 90, 91, 92, 93 is associated with three bits of the 12-bit page offset. Thus subfield 90 encodes the three page offset address bits A11, A10, A9, while sub-field 91 encodes A8, A7, A6, sub-field 92 encodes A5, A4, A3, while sub-field 93 encodes A2, A1, and A0. If a logical "1" (an electrical signal of typically 5 or 3.3 volts) is used to denote validity, then a bit-mask value of "11100000" would indicate that the first three of the eight blocks are valid. If this were for the first sub-field 90, then the first three 512-byte sub-blocks on the page would be valid.

ONE-HOT ENCODING

One-hot encoding is a method wherein only a single bit in a field of bits is active. This single active bit selects only one valid block out of a plurality of blocks. The sub-fields 90, 91, 92, 93 may be encoded by several methods. If only one valid sub-block is allowed for every bit-mask, then the previously-described encoding may be used, since each 8-bit mask would identify only a single valid sub-block of the eight sub-blocks for each sub-field. Thus the encoding:

| 00100000 | 00000001 | 10000000 | 00010000 |
|---|---|---|---| for sub-fields 90, 91, 92, 93 would indicate that the third of the eight 512-byte subblocks is valid, and within this third 512-byte block, only the last (eighth) 64-byte subblock is valid. Within this 64-byte block, only the first 8-byte block is valid, and only the fourth of these 8 bytes is valid. This encoding thus specifies that the 1476$^{th}$ byte on the 4096-byte page is the only byte valid. Note that the last sub-field 93, need not have only a single valid bit since there are no more sub-blocks with finer granularity. Thus if the last sub-field 93 had the bit-mask value:

| 00011110 |
|---| then bytes 4, 5, 6, and 7 would be valid in that field. This specifies that the four bytes 1476 through 1479 are valid.

TRANSITION ENCODING

If the mask having a "1" value indicates validity, then a mask having a bit-transition from a 1 to a 0, or a 0 to a 1 can be used to indicate that the next lower sub-field's bit mask must be consulted. Transition encoding can be used to specify the valid region within a page when only a single event is present on the page. This is typical for the beginning and end of a segment. The lower bound of the segment, the base, can be encoded by a transition from a 0 to a 1, which will specify that the upper portion of the page is valid while the lower portion is not valid. The upper bound of the segment may be specified by a transition from a 1 to a 0, indicating that the lower portion of the page is valid while the upper portion is not valid. The example of Table 1 showed an upper bound of 0xDA5 hex, or 3492 decimal, within a page with the lower portion, from 0 to 3492, valid for the segment. This value can be encoded:

| 11111100 | 11111100 | 11110000 | 11111000 |
|---|---|---|---| indicating that the first 6 512-byte blocks are valid, and the first 6 of the 8 64-byte blocks in the 7th 512-byte block are valid. Within the 7th 64-byte block, the first four 8-byte blocks are valid, and the first 5 bytes of the 5th 8-byte block, of the 7th 64-byte block, of the 7th 512-byte block, are valid. Thus a "1" indicates that the entire block specified is valid, while the first "0" from the left side indicates that a portion of that sub-block may be valid, depending on the next lower sub-fields.

BUBBLE ENCODING

When only a small portion of the page needs to be disabled or marked as invalid, as for example when a watchpoint is set or a faulty memory location specified, the bubble encoding may be employed. Again a "1" indicates that the sub-block which corresponds to the mask bit is valid. A single "0" is allowed for any sub-field. This zero indicates that the next lower sub-field mask should be consulted to determine which portion of the page is not valid. The byte at page offset address 0x6B4 hex would be specified with this encoding:

| 11101111 | 11011111 | 11111101 | 11110111 |
|---|---|---|---|

The 4th 512-byte block has the third 64-byte block with a non-valid byte on it. In this 3rd 64-byte block, the 7th 8-byte block has the 5th byte marked as not valid. Thus only one byte at 6B4 hex is not valid.

Various other encodings and combinations with the page offset bounds field are possible within the spirit of the invention. One or more control bits could be stored with the TLB entry to specify which encoding, one-hot, transition, bubble, or another should be used for that particular TLB entry, or a global control bit could indicate the type of encoding used.

SUB-PAGE VALIDITY BUFFER

Since there are usually only a small, fixed number of events on a system, it is not necessary to add sub-page validity information to every TLB entry. However, since the TLB is usually implemented as a small RAM array, adding additional bits to some but not all of the entries removes the symmetry of the RAM array and may make the TLB more expensive to implement. In addition, the longer TLB entries with the sub-page validity fields must be reserved for pages with events. This adds complexity to TLB management.

Figure 9:
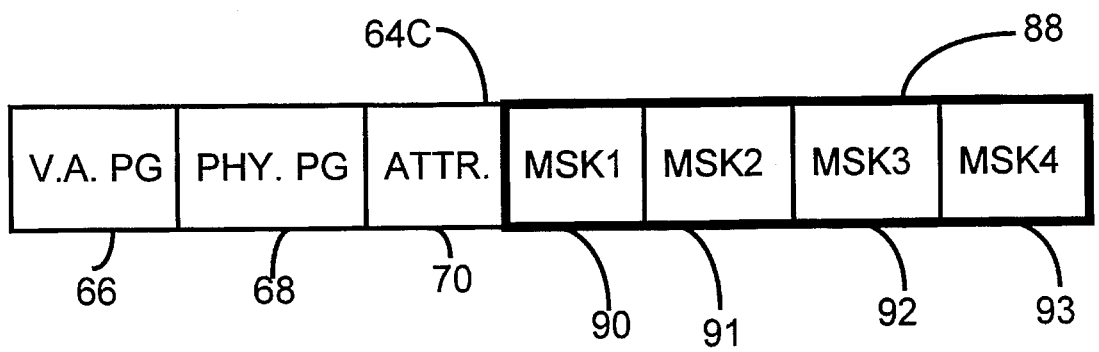
FIG. 9 is a TLB entry having a valid mask for sub-page validity.
Figure 10:
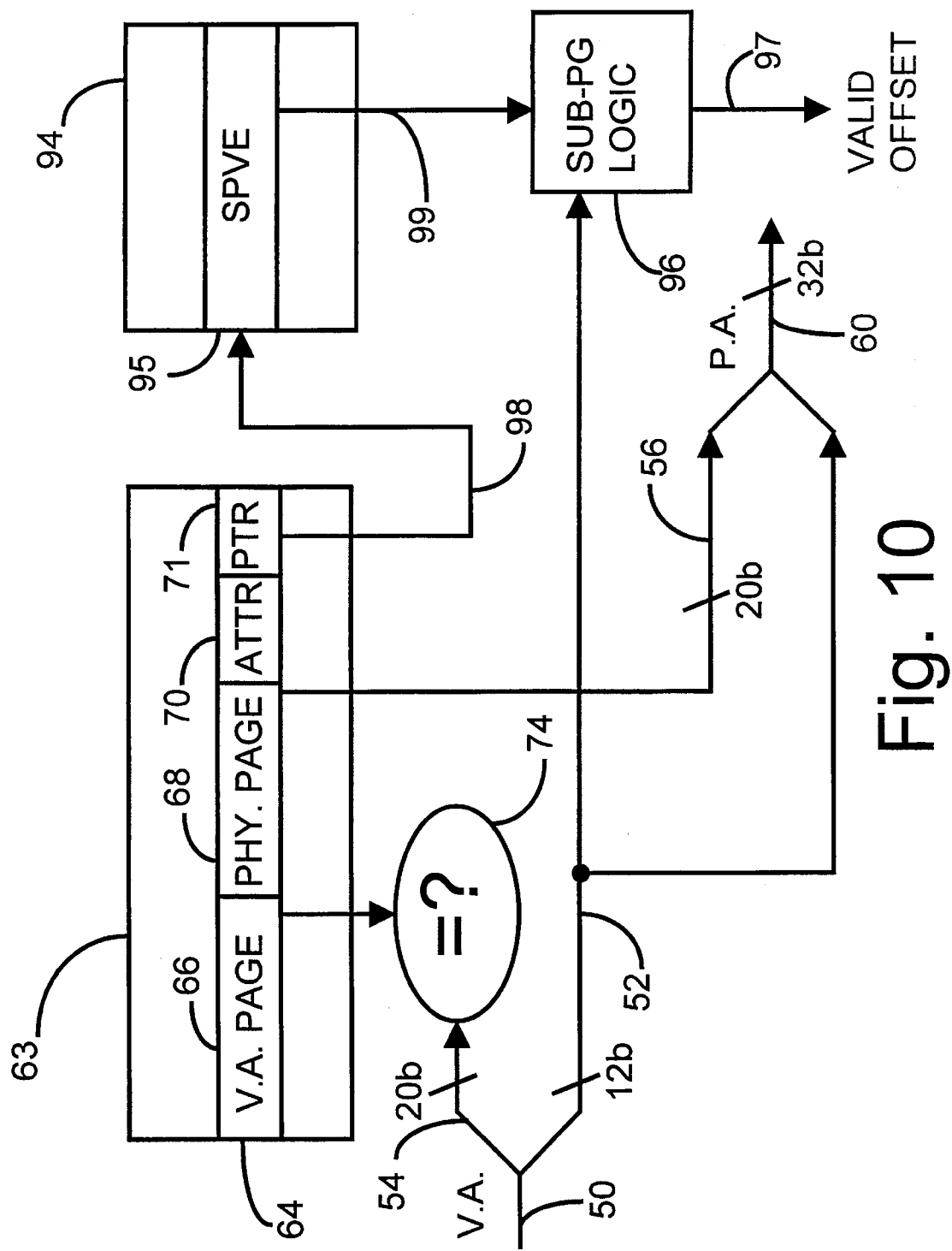
FIG. 10 shows a sub-page validity buffer accessed by a pointer field in a TLB.

A flexible alternative is to add a second auxiliary structure for storing the sub-page validity information on the CPU die. This auxiliary structure is closely coupled to the regular TLB. This structure, the sub-page validity buffer 94 (SPVB), is shown in FIG. 10 along with the regular TLB 63. TLB 63 contains a virtual page number field 66, a physical page number field 68, and attributes 70, as in the prior-art TLB. However, additional index pointer bits are added to each TLB entry, as shown for entry 64 with index field 71. Index field 71 is used to indicate the location in the SPVB of the sub-page validity entry 95 associated with the TLB entry 64. This index field 71 is loaded by the system software or TLB handler when the TLB entry is loaded. If no event exists for the page, then the index entry is set to "0000" to indicate that the SPVB 94 need not be consulted. Other values of index field 71 will be read out of TLB 63 over index bus 98 to select an entry 95 in SPVB 94. SPVB entry 95 may contain offset bounds fields and control bits, as described earlier in reference to FIG. 8, or SPVB entry 95 may contain sub-fields for valid masks, as described earlier in reference to FIG. 9, or a combination of these methods may be used. The size of the SPVB 94 is based on the number of events that may need to be loaded into the TLB at any one time. Thus the SPVB 94 may be much smaller than the TLB 63. Because index bits 71 are used to specify which entry 95 in SPVB 94 is to be referenced, any TLB entry 64 may use any entry 95 in the SPVB 94. Thus great flexibility is afforded the system software.

TLB entry 64 could include additional information preferably stored in the SPVB 94, such as not only index bits 71 to locate the particular corresponding entry 95 in SPVB 94, but also to indicate how the SPVB entry 95 is to be used. For example, the control bits 86 of FIG. 8 could be stored in either the TLB 63 or the SPVB 94.

OPERATION OF SUB-PAGE VALIDITY BUFFER

Sub-page validity buffer 94 (SPVB) operates in conjunction with TLB 63 in the following manner. A 32-bit virtual address 50 has an offset portion 52 and an upper page number portion 54. The virtual page number portion 54 is compared to the virtual page number 66 stored in TLB entry 64 using comparator 74, which signals a page hit if the page numbers match. Using well-known techniques in the art, a single TLB entry 64 may be compared, or an associative search may be made of all entries in the TLB, or a sub-set of the entries may be compared if the TLB is of the set-associative type. If a page hit is signaled, then index bits 71 are read out of TLB 63 and used to select an entry 95 in SPVB 94. The sub-page validity entry 99 is read out of SPVB 94 and inputted to logic block 96. The lower offset portion 52 of the virtual address 50 from the ALU is also inputted to the logic block 96. Logic block 96 uses the sub-page validity entry transferred over bus 99 to control combinatorial logic and comparators for comparing the sub-page defined in SPVB entry 95 with the page offset address 52. If the page offset address is found to lie within a valid portion of the page, then a valid offset is signaled over line 97, allowing the CPU to continue the memory reference. However, if the offset 52 lies outside of the valid portion of the page, then logic block 96 signals that the page offset is not valid on line 97, causing a page fault to be signaled, which invokes a TLB handler. Logic block 96 can be implemented by one skilled in the art using random or combinatorial logic based on the earlier description of the various embodiments of this invention.

SUB-PAGE VALIDITY BUFFER WITH VIRTUAL LOOKUP

Figure 11:
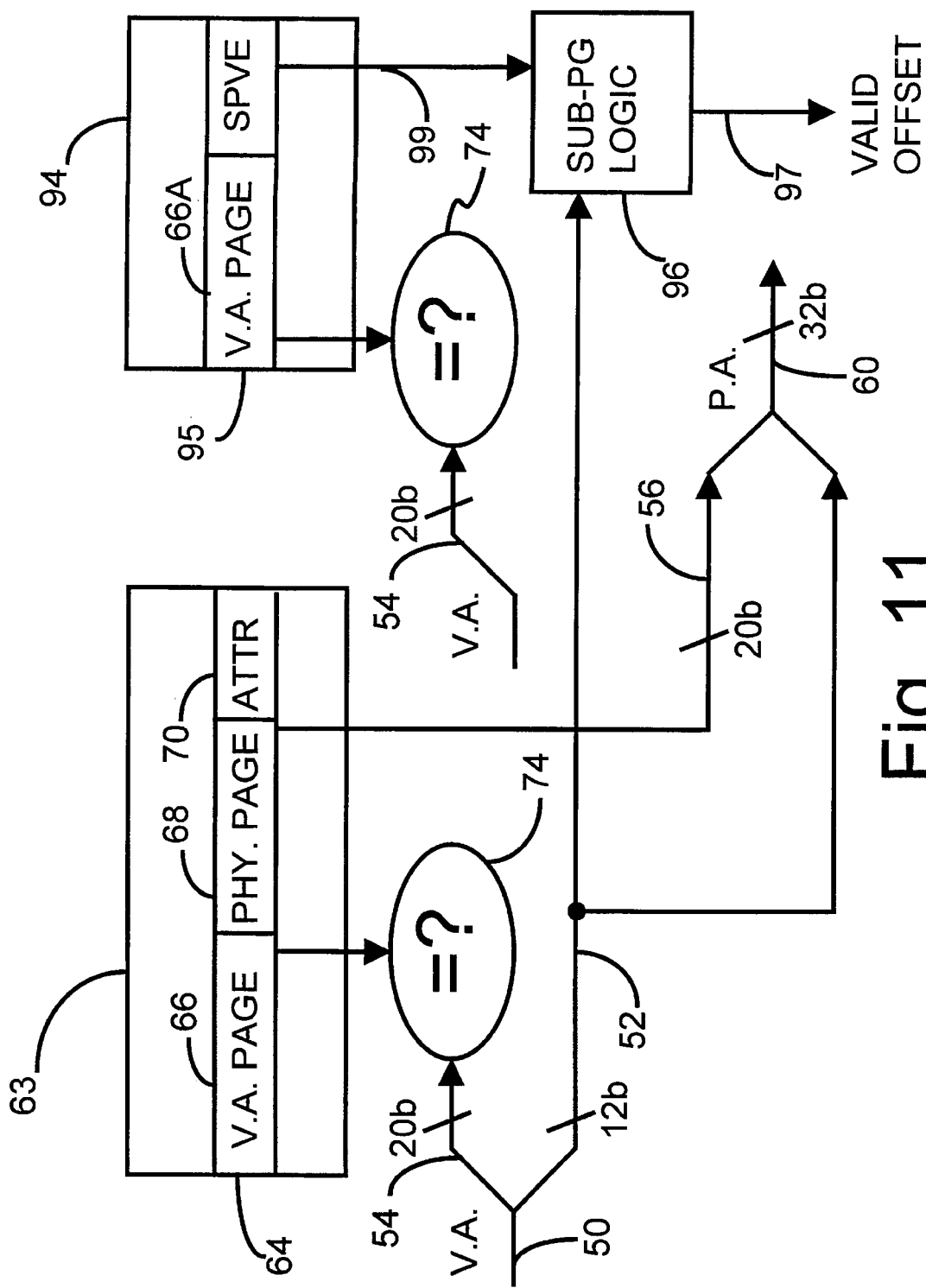
FIG. 11 shows a sub-page validity buffer accessed by a virtual address look-up.

An alternative embodiment, shown in FIG. 11, of the sub-page validity buffer 94 (SPVB) is to include a virtual page number field 66A in SPVB entry 95. The proper entry 95 in the SPVB 94 is thus determined by an associative look-up as is performed by the associative TLB 63. If a match is found between the virtual page number portion 54 of the virtual address 50 and the virtual page number 66A stored in a SPVB entry 95, then that corresponding entry 95 is selected and its sub-page validity information 99 is inputted to logic block 96, which operates in the same manner as described for FIG. 10. Should no matching virtual page entry 66A be found in the SPVB 94, then the page has no events defined for it and a valid offset is signaled on line 97. If the page is also not present in TLB 63, then a page miss is signaled and a page fault occurs, invoking the TLB handler, either a software routine or a hardware sequencer. This implementation may be faster than that of FIG. 10 because the virtual lookup in the SPVB 94 operates in parallel with the lookup in TLB 63, whereas the embodiment of FIG. 10 requires that the TLB 63 lookup occur first so that the index bits 71 may be read out of TLB 63 and then used to index SPVB 94.

Figure 13:
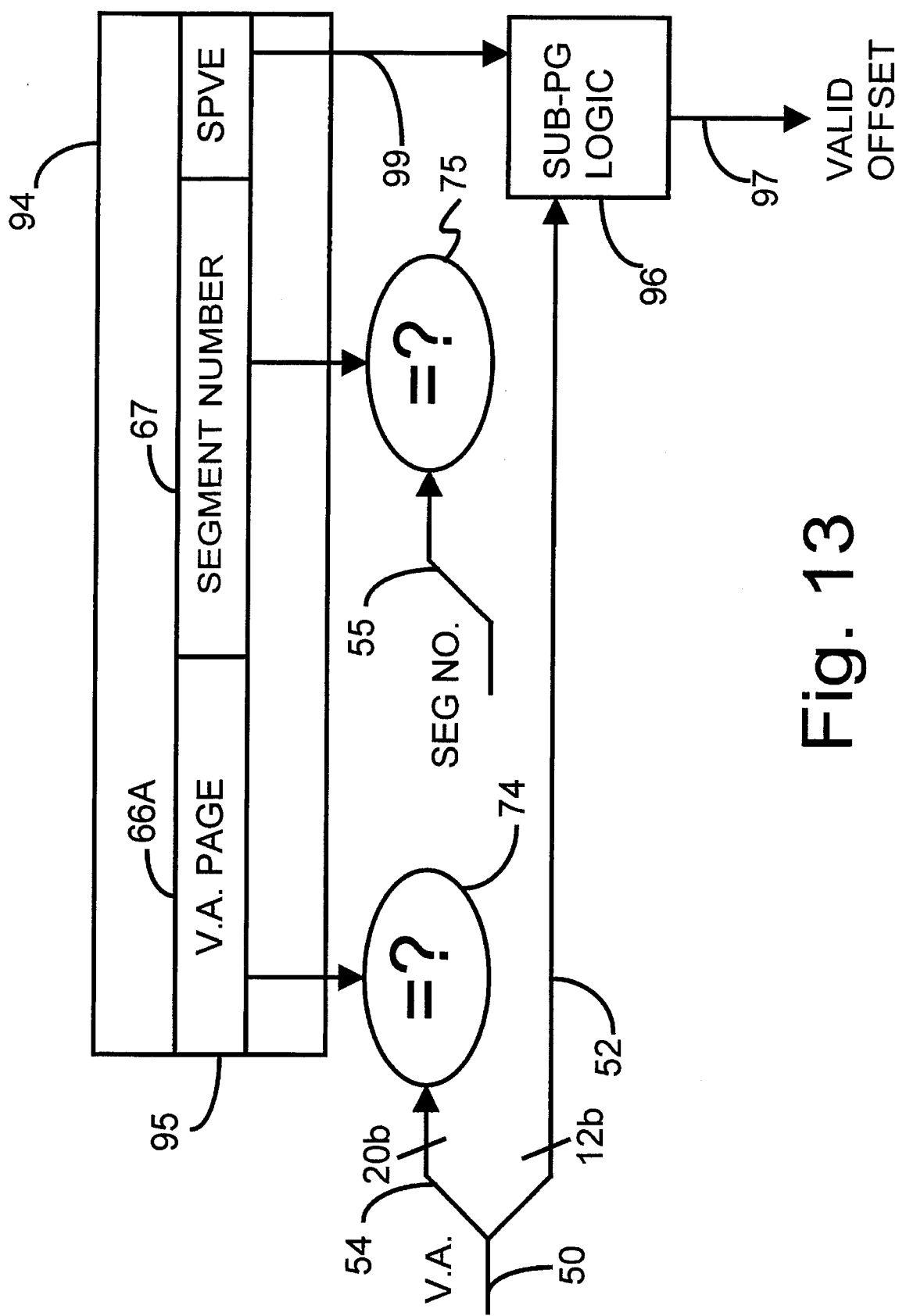
FIG. 13 shows a sub-page validity buffer accessed by the segment number and the virtual page number.

FIG. 13 shows that the sub-page validity buffer may be accessed by additional information, such as which segment register was used to cream the linear address of a reference. This would aid emulation of a segmented system with several segment registers. The TLB entry (as shown in FIG. 11) still includes the control information on a page basis, but the sub-page validity buffer 94 of FIG. 13 will have an additional segment number field 67 indicating which segment register the entry 95 refers to. This additional segment number field 67 is stored in SPVB entry 95 along with the virtual page number field 66A. Both the virtual page number and the segment number must match for a hit in the sub-page validity buffer. Comparator 74 will compare the virtual page number as described in reference to FIG. 11, while comparator 75 compares the segment number stored in the additional segment number field 67. The segment number 55 from the address generation unit will be sent to the paging system along with virtual address 50. The access to the sub-page validity buffer may still proceed in parallel with the translation-lookaside buffer look-up.

SOFTWARE HANDLER ROUTINE

Figure 12:
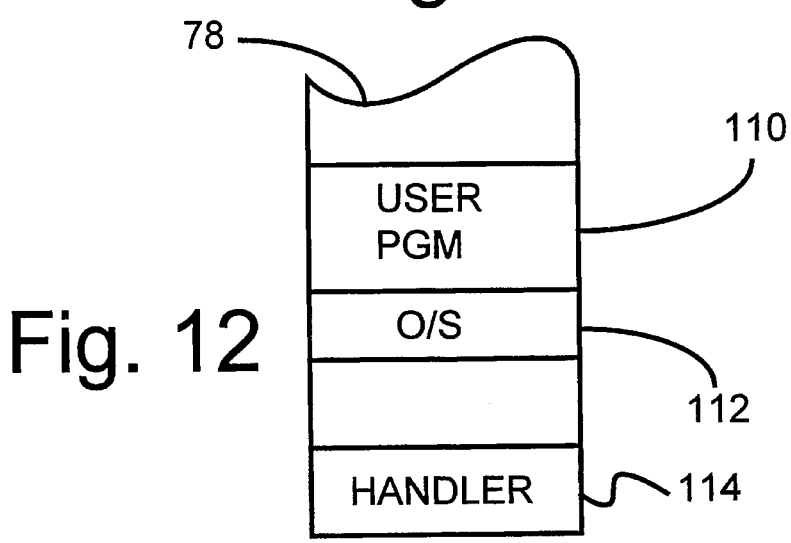
FIG. 12 is a diagram of a memory space containing a software handler routine.

FIG. 12 is a diagram of a physical memory space 78 which contains a user program 110, an operating system 112, and a software handler routine 114. Software handler routine 114 will be activated when a page fault occurs, either being directly called by the page fault or called by another routine, such as another TLB miss handler routine in the operating system 112, responsible in some prior-art systems for loading the TLB when paging is enabled. Software handler routine 114 will fetch the segment bounds fields from the segment descriptors, which are usually stored with the operating system 112. Software handler routine 114 will compare the segment bound fetched from the segment descriptor to the offset portion of the linear or virtual address to check that the memory reference is to a portion of a page that is within the segment bounds. This checking need not be performed in the embodiments that contain sub-page compare hardware on the CPU itself. If the page offset is within the portion of the page that is valid for the segment, or the subset of page offsets that are valid for a partially-valid page, then the software handler routine 114 will load a translation into the TLB or emulate the memory reference. In addition, if the page is wholly valid, but not yet loaded into the TLB, then the software handler routine 114 may load the translation into the TLB. The software handler routine 114 could also signal to the operating system 112 to allow a routine in the operating system 112 to load the TLB entry.

ALTERNATE EMBODIMENTS

Several other embodiments are contemplated by the inventors. Various combinations of the embodiments described and trade-offs among them are possible. For example, the variable-page-size embodiment suffers from the extra hardware needed to designate the sub-page granularity down to the single-byte level. The one-time-TLB embodiment uses very little additional hardware, because slower software is used for bounds checking. The two embodiments could be combined to reach an optimum trade-off between the higher performance of designating sub-pages in the TLB hardware, and the lower cost and complexity of using the software for bounds checking. Instead of designating sub-pages down to byte-granularity, sub-pages could be defined only down to an intermediate granularity, with software checking the remaining references. Thus sub-pages of 2K, 1K, 512, and 256 bytes could be defined, and any reference within a block of 256 bytes of the event or bound would be checked by software. This trade-off would support 4 of the 12 page sizes between 2K and 1 byte, which is less than half the hardware for the full implementation, but reduces software checking to only 256 bytes of the 4096 bytes in the page, or $1/16$th of the total page. In summary, paging may be used to reduce the amount of hardware required to support segmentation.

A page size of 4096 bytes was described with reference to the embodiments, but other page sizes and address sizes may be easily substituted by one skilled in the art. Many other combinations of the embodiments disclosed are possible in light of the teachings herein.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A paging system adapted for emulating watchpoint checking wherein pages absent watchpoints are not checked for watchpoint violations, whereas pages containing watchpoints are tested for watchpoint violations by a sub-page validity buffer for checking validity of a virtual address, said virtual address comprising a virtual page number and a page offset, said sub-page validity buffer comprising:

a plurality of buffer entries, each of said plurality of buffer entries comprising:
   a virtual page number field; and
   a sub-page validity field for indicating a valid subset of page offsets within a page;

first compare means for receiving said virtual page number and comparing said virtual page number field with said virtual page number, said first compare means indicating a selected buffer entry of said plurality of buffer entries if said virtual page number field matches said virtual page number, said selected buffer entry including a selected sub-page validity field; and second compare means for receiving said selected sub-page validity field and comparing said page offset to said valid subset of page offsets, said second compare means indicating that said page offset is valid if said page offset is not within said valid subset of page offsets, said second compare means signaling that said page offset is valid if no buffer entry in said plurality of buffer entries is a matching buffer entry, said matching buffer entry containing said virtual page number field matching said virtual page number, wherein the absence of said matching buffer entry in said sub-page validity buffer indicates that watchpoints do not need to be checked for said virtual address, wherein pages completely absent watchpoints are not checked for watchpoint violations.

2. The buffer of claim 1 wherein said sub-page validity field comprises:

a first field for specifying a size of said valid subset of page offsets, said size being equal to or less than said size of a page; and a second field for specifying a page offset indicating a location of said valid subset of page offsets.

3. The buffer of claim 1 wherein said sub-page validity field comprises:

a first field for specifying a first page offset indicating a location of said valid subset of page offsets;

control bits for encoding control information about said first field; and said second compare means including means for interpreting said first field with said control information.

4. The buffer of claim 3 wherein said control bits indicate if page offsets within said valid subset of page offsets must be greater than or equal to, or less than or equal to said first page offset in said first field.

5. The buffer of claim 4 wherein said sub-page validity field further comprises:

a second field for specifying a second page offset further indicating said location of said valid subset of page offsets;

wherein said control bits further indicate if said valid subset of page offsets is between said first page offset and said second page offset, said control bits further indicating if said valid subset of page offsets is outside of a region between said first page offset and said second page offset.

6. The buffer of claim 1 wherein said sub-page validity field comprises:

a valid mask field, said valid mask field comprising:
   a plurality of bit masks, said bit masks comprising a plurality of valid bits for indicating if a fixed-size portion of a page is valid.

7. The buffer of claim 6 wherein each bit mask in said plurality of bit masks corresponds to a different size for said fixed-size portion, bit masks corresponding to a larger fixed-size portion indicating which fixed-size portion is referred to by said bit mask corresponding to a next smaller fixed-size portion.

8. A paging system for translating a virtual address to a physical address, said virtual address comprising a virtual page number and a page offset, said paging system adapted for emulating watchpoint checking, said paging system comprising:

a translation-lookaside buffer (TLB), said TLB comprising a plurality of page entries, each of said plurality of page entries comprising:
   a virtual page number field for comparing with said virtual page number, a match indicating that the page entry with the matching virtual page number field be selected;
   a physical page address field, for combining with said page offsets, for outputting to a main memory;

sub-page validity means for indicating a specified subset of page offsets for pages containing a watchpoint, said specified subset defined by said watchpoint, the absence of a sub-page validity means for a particular page entry in said plurality of page entries indicating that watchpoints do not need to be checked for said particular entry; and sub-page compare means for comparing said page offset with said specified subset of page offsets, said sub-page compare means providing a watchpoint indication if said page offset is within said specified subset of page offsets, wherein pages without watchpoints are not checked for watchpoint violations, whereby watchpoint checking is emulated by said paging system for a page that contains a watchpoint.

9. The paging system of claim 8 wherein said sub-page compare means comprises a software compare routine that compares said page offset to said watchpoint; said paging system further comprising a translation handler, for loading page entries from main memory into said TLB, said translation handler being activated when no page entry in said TLB has a virtual page number field that matches said virtual page number, said translation handler not loading a page entry into said TLB for a partially-valid page having said watchpoint within said page, said translation handler activating said software compare routine when a partially valid page is accessed, whereby said TLB will be loaded only with fully valid pages, whereas partially valid pages containing said watchpoint always cause a page fault, activating said software compare routine.

10. The system of claim 9 further comprising a one-time TLB entry, loaded by said translation handler if said page offset is within a valid portion of said partially-valid page, said software compare routine providing a valid indication to said translation handler if said page offset is not within said specified subset of page offsets, said one-time TLB entry being valid for a single memory reference only.

11. The paging system of claim 8 wherein said sub-page validity means comprises a sub-page validity field for indicating said specified subset of page offsets, said specified subset of page offsets defined by said watchpoint, said sub-page validity field having a corresponding page entry in said TLB;

said sub-page compare means receiving said sub-page validity field corresponding to said selected page entry, said sub-page compare means providing said watchpoint indication if said page offset is within said specified subset of page offsets.

12. The system of claim 11 wherein said sub-page validity field comprises:

a first field for specifying a size of said specified subset of page offsets, said size being equal to or less than said page size; and a second field for specifying a page offset indicating a location of said specified subset within said page.

13. The system of claim 11 wherein said sub-page validity field comprises:

a first bounds field for specifying a first page offset indicating a location of said specified subset within said page; and control bits for encoding a manner in which said sub-page compare means compares said page offset to said first bounds field.

14. The system of claim 13 wherein said control bits indicate if said specified subset of page offsets is greater than or less than said first page offset in said first bounds field.

15. The system of claim 14 wherein said sub-page validity field further comprises:

a second bounds field for specifying a second page offset further indicating said location of said specified subset within said page;

wherein said control bits further indicate if said specified subset of page offsets is between said first page offset and said second page offset or if said specified subset of page offsets is outside of a region between said first page offset and said second page offset.

16. The system of claim 11 wherein said sub-page validity field comprises:

a valid mask field, said valid mask field comprising:

a plurality of bit masks, said bit masks comprising a plurality of valid bits, each of said plurality of valid bits for indicating if a fixed-size portion of a page is valid.

17. The system of claim 16 wherein each bit mask in said plurality of bit masks corresponds to a different size for said fixed-size portions, said bit masks corresponding to a larger fixed-size portion indicating said location of said fixed-size portions that said next smaller bit mask refers to.

18. The system of claim 11 wherein said sub-page validity field is joined to a corresponding page entry in said TLB and stored in said TLB.

19. The system of claim 11 wherein said sub-page validity field is stored in a sub-page validity buffer comprising a plurality of sub-page entries, said plurality of page entries in said TLB further comprising a pointer field for selecting a sub-page entry in said sub-page validity buffer.

20. The system of claim 11 wherein said sub-page validity field is stored in a sub-page validity buffer comprising a plurality of sub-page entries, each entry in said plurality of sub-page entries comprising said sub-page validity field, and a second virtual page number field, a sub-page entry being selected if said second virtual page number field matches said virtual page number.

21. The system of claim 20 wherein said virtual address further comprises a segment number, each entry in said plurality of sub-page entries further comprising a segment number field, said sub-page entry being selected if said segment number of said virtual address matches said segment number field and if said second virtual page number field matches said virtual page number.

22. A method for emulating watchpoint checking in a paging system, said method comprising:

loading a translation-lookaside buffer (TLB) with entries corresponding to pages containing a fixed number of page offsets, each entry present in said TLB corresponding to a page wherein every page offset is valid for reference, said page being absent any watchpoints;

translating a virtual address to a physical address using said entries in said TLB when said virtual address has a corresponding entry in said TLB, said corresponding entry having a virtual page number field matching a portion of said virtual address;

generating a page fault if said virtual address has no corresponding entry in said TLB;

loading a new entry into said TLB if said virtual address corresponds to a page wherein every page offset within said page is valid for reference and absent watchpoints; and executing a software handler routine if said virtual address does not correspond to a page wherein every page offset within said page is valid for reference, said software handler routine comparing an offset portion of said virtual address to a watchpoint, said software handler routine continuing execution of a user program if said offset portion of said virtual address is not within said watchpoint, said handler routine sending a watchpoint fault to said user program if said offset portion of said virtual address is within said watchpoint, whereby watchpoint checking is performed by said software handler routine for pages containing a watchpoint.

23. The method of claim 22 wherein said software handler routine emulates a memory access referenced by said virtual address if said offset portion of said virtual address is not within said watchpoint, said software handler routine transferring data between a main memory and a central processing unit generating said virtual address, said software handler routine continuing execution of said user program after transferring said data.

24. The method of claim 22 wherein said software handler routine loads a translation entry into a one-time TLB if said offset portion of said virtual address is not within said watchpoint, said one-time TLB being valid only for said virtual address that is being translated, said software handler routine continuing execution of said user program after loading said translation entry, said user program using said translation entry in said one-time TLB to continue execution.

25. The method of claim 22 wherein said virtual address is a linear address generated by adding a segment base to an address generated by said user program.

* * * * *